(12) United States Patent
Guan et al.

(10) Patent No.: US 11,988,800 B2
(45) Date of Patent: May 21, 2024

(54) COMMON MODE REJECTION METHOD AND APPARATUS FOR ELECTROMAGNETIC INDUCTION LOGGING

(71) Applicant: University of Electronic Science and Technology of China, Chengdu (CN)

(72) Inventors: Guoyun Guan, Chengdu (CN); Min Meng, Chengdu (CN); Jun Hu, Chengdu (CN); Zaiping Nie, Chengdu (CN)

(73) Assignee: University of Electronic Science and Technology of China, Chengdu (CN)

( * ) Notice: Subject to any disclaimer, the term of this patent is extended or adjusted under 35 U.S.C. 154(b) by 102 days.

(21) Appl. No.: 17/851,348

(22) Filed: Jun. 28, 2022

(65) Prior Publication Data

US 2023/0305181 A1    Sep. 28, 2023

(51) Int. Cl.
*G01V 3/28* (2006.01)
*G01V 3/30* (2006.01)

(52) U.S. Cl.
CPC . *G01V 3/28* (2013.01); *G01V 3/30* (2013.01)

(58) Field of Classification Search
None
See application file for complete search history.

(56) References Cited

U.S. PATENT DOCUMENTS

| | | | |
|---|---|---|---|
| 4,536,714 A | 8/1985 | Clark | |
| 4,808,929 A | 2/1989 | Oldigs | |
| 6,586,939 B1 | 7/2003 | Fanini et al. | |
| 10,416,337 B2 | 9/2019 | Kirchmeier et al. | |

*Primary Examiner* — Douglas X Rodriguez
(74) *Attorney, Agent, or Firm* — Andrew D. Fortney; Central California IP Group, P.C.

(57) ABSTRACT

A method of reducing or rejecting common mode interference and a circuit for electromagnetic induction logging with improved common mode interference reduction or rejection are disclosed, which are useful in the field of electromagnetic induction logging technology. Accurate formation signals are calculated based on phases and amplitudes of common mode signals, which do not change with the coil access mode, and phases of differential signals, which are reversed with amplitudes unaltered when the coil is connected reversely. This provides a mechanism to effectively eliminate the influence of common mode interference even when the common mode interference is greater in amplitude than the signals from a geological formation.

12 Claims, 2 Drawing Sheets

The receiving coil outputs the formation signal received in real time together with a common mode interference signal from the coil to the signal acquisition module when the switch module and the receiving coil are in the forward connection mode. Phase sensitive detection processing is conducted by the processor on the data output by the signal acquisition module to obtain the forward measured value.

↓

The receiving coil outputs the formation signal received in real time together with the common mode interference signal from the coil to the signal acquisition module when the switch module and the receiving coil are in the reverse connection mode. Phase sensitive detection processing is conducted by the processor on the data output by the signal acquisition module to obtain the reverse measured value.

↓

The formation signal and the common mode interference signal are calculated by the processor from the forward measured value and the reverse measured value. The formation signal is a differential signal.

FIG. 1

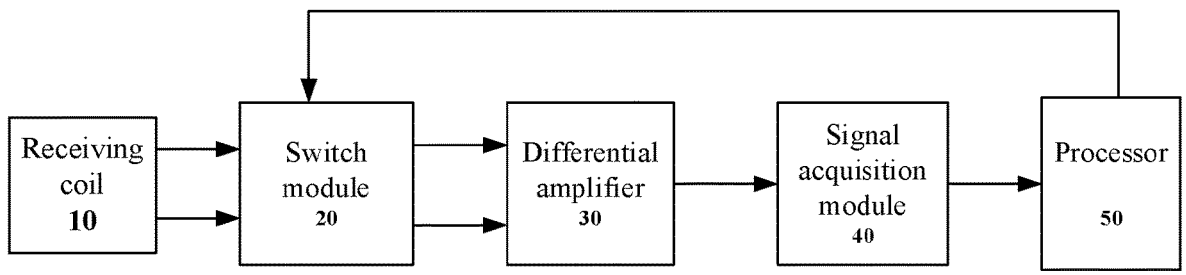

FIG. 2

COMMON MODE REJECTION METHOD AND APPARATUS FOR ELECTROMAGNETIC INDUCTION LOGGING

CROSS REFERENCE TO RELATED APPLICATIONS

This application claims the benefit of Chinese Pat. Appl. No. 202210281298.2, filed on Mar. 23, 2022, incorporated herein by reference as if fully set forth herein.

FIELD OF THE INVENTION

The present invention generally relates to the field of stratigraphic surveys, and in particular, to a common mode rejection method for electromagnetic induction logging.

DISCUSSION OF THE BACKGROUND

In the field of oilfield logging, an electromagnetic induction logging instrument excites strong electromagnetic fields in a geological formation through a transmitting coil and acquires parameters of the formation (such as resistivity and dielectric constant) by measuring the phase and amplitude of the receiving coil signal. However, in actual measuring processes, since the distance between the transmitting coil and receiving coil of the logging instrument is large, the instrument receives a weak measured signal through the receiving coil and acquisition circuit after the signal has attenuated through the formation. Also, interference may exist within the received signal, which is mainly (1) common mode interference that can result from capacitive coupling caused by parasitic capacitance between the transmitting and receiving coils and/or (2) conductive interference between the transmitting and receiving circuits in the instrument. A large common mode signal inevitably increases the difficulty for the receiving system to receive signals. At the same time, a method of increasing signal amplitude by increasing the amplifying power has no effect because the noise and interference signal will also be amplified, which will lead to excessive fluctuations in the measurements, and thus, inaccuracy in the resulting formation parameters.

There are mainly two traditional types of methods for common mode interference rejection of the induction logging instrument.

A method of improving the coil structure is disclosed in U.S. Pat. No. 10,416,337. For instance, by adding a center tap and connecting it to ground, the common mode interference can be partially reduced by utilizing the symmetry on both sides of the tap and the common mode rejection characteristic of the differential amplifier. However, in practice, a differential coil with a center tap cannot be absolutely symmetrical, resulting in a large residual common mode signal on the coil. In addition, the differential amplifier displays a high common mode rejection ratio only at frequencies below 1 KHz, and a higher frequency suggests a lower common mode rejection ratio. In this way, all differential amplifiers including the instrumentation amplifier are unable to effectively reject common mode signals at higher frequencies (e.g., 10 KHz-10 MHz), which are often used for induction logging. Therefore, when common mode signals are strong, this method falls short of effectiveness, with a large proportion of common mode signals unrejected.

Other methods are disclosed in U.S. Pat. Nos. 4,536,714, 4,808,929, and 6,586,939, respectively, which all involve coil shielding by metal structures to notably lower the common mode signal strength on the coil. However, due to the impossibility of complete sealing and the skin effect of electromagnetic signals, common mode signals cannot be eliminated, in particular for low-frequency signals, such as those below 100 KHz.

The two types of traditional common mode rejection methods either change the original structure of the coil or affect the original installation approach. Besides, these methods are prone to be affected by temperature and vibration, and are subject to aging after multiple uses in the high-temperature downhole environment. Also, regular calibration must be conducted on the instrument to undo the impact of aging. To sum up, traditional common mode rejection methods have the following drawbacks: (1) incomplete rejection of common mode signal interference; (2) lack of reliability; and (3) higher difficulty for instrument production and thus higher production and maintenance costs.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

To overcome the abovementioned drawbacks and enhance the measurement accuracy and stability, the rejection of interference signals must be reinforced. By proper means, the common mode interference can be filtered out to the maximum extent to extract genuine and effective geological formation signals.

In previous approaches, the distance between the transmitting and receiving coils of an electromagnetic induction logging instrument is relatively far, and thus, a signal received by the receiving coil becomes weak after attenuation in the formation. Meanwhile, strong common mode interference signals are mixed in the received signals, making it more difficult for the receiving system to process the signal from the formation, which leads to inaccurate and greatly fluctuating measurements. To deal with these problems, the present invention provides a common mode rejection method for electromagnetic induction logging instruments.

In view of the technical problems above, embodiments of this invention provide a common mode rejection method for electromagnetic induction logging and an electromagnetic induction logging instrument with common mode noise rejection. The measurement is conducted with the instrument, which includes a receiving coil, a switch or switch module, a differential amplifier, a signal acquisition module, and a processor. The differential amplifier is connected to the output end of the switch module, amplifies the differential signal output by the switch module, and outputs the amplified differential signal to the signal acquisition module. The processor may also be in a module (e.g., as part of a processor module) and is connected to the signal acquisition module and performs phase sensitive detection processing on the data output by the signal acquisition module. The processor controls the switch module switch to cause the receiving coil to be in the forward or reverse connection mode.

When the switch places the receiving coil separately in the forward connection mode and the reverse connection mode, the receiving coil outputs the formation signal received in real time, together with the common mode interference signal from the coil to the signal acquisition module. The processor conducts phase-sensitive detection processing on the data output by the signal acquisition module and obtains a forward measured value and reverse measured value, respectively. The formation signal (i.e., from the geological formation) is caused by an electric current passing through a transmitting coil. The formation signal is the desired signal from the receiving coil. The common mode interference signal is an undesired signal which comes from the apparatus or instrument itself.

The processor calculates or determines the formation signal and the common mode interference signal from the forward measured value and the reverse measured value.

In the common mode interference reduction method for downhole electromagnetic induction measurement(s) provided by the present invention, an accurate formation signal can be obtained by the following process. The switch is utilized to place the receiving coil on the receiving channel side in one of the two connection modes, while the processor is used for conversion of the measured data (e.g., into the formation signal, after reducing or rejecting the common mode interference). Given that the phase and amplitude of a common mode signal do not vary with the coil connection mode, and the amplitude of a differential signal remains the same in either coil connection mode, but the phase of the differential (formation) signal is reversed when the coil is connected reversely, the rejection or elimination of common mode interference can be achieved by subtracting the common mode signal from the measured result, which will result in an accurate formation signal as a differential signal. When the common mode interference signal is larger than the formation signal (i.e., the formation signal from the receiving coil is smaller than the common mode interference after the transmitting signal attenuated in the geological formation), the present invention is still effective for eliminating the influence of the common mode interference. The invention applies to all electromagnetic induction logging instruments with coils as sensors, including wireline logging and logging while drilling, for rejecting or eliminating common mode interference signals during downhole measurement of the formation signal.

Thus, one aspect of the invention relates to a method of reducing or rejecting common mode interference, comprising separately placing a receiving coil in each of a forward connection mode and a reverse connection mode using a switch, receiving a signal from a geological formation in the receiving coil, outputting a formation signal and common mode interference from the receiving coil, amplifying the formation signal and the common mode interference using a differential amplifier, receiving the amplified formation signal in a signal acquisition module, outputting data from the signal acquisition module, conducting phase-sensitive detection processing on the data using a processor connected to the signal acquisition module, and calculating the formation signal and the common mode interference according to a forward measured value and a reverse measured value using the processor. The processor separately places the receiving coil in each of the forward connection mode and the reverse connection mode, and obtains the forward measured value when the receiving coil is in the forward connection mode and the reverse measured value when the receiving coil is in the reverse connection mode. The formation signal is a differential signal. Calculating the formation signal and the common mode interference may comprise subtracting the common mode interference in one of the forward measured value and the reverse measured value from the common mode interference in the other, thereby reducing or rejecting the common mode interference.

In some embodiments, the formation signal and the common mode interference are calculated using the equations:

$$S_1 = S_c + S_d$$

$$S_2 = S_c - S_d$$

$$S_d = (S_1 - S_2)/2$$

$$S_c = (S_1 + S_2)/2$$

where $S_d$ represents the differential signal, $S_c$ represents the common mode interference, the forward measured value is $S_1 = (x_1, y_1)$, where $x_1$ is a real part of the forward measured value and $y_1$ is an imaginary part of the forward measured value, and the reverse measured value is $S_2 = (x_2, y_2)$, where $x_2$ is a real part of the reverse measured value and $y_2$ is the imaginary part of the reverse measured value. In further embodiments, the formation signal may be calculated according to the formulas:

$$S_d = S_1 - S_c \text{ or}$$

$$S_d = S_c - S_2.$$

A further aspect of the invention concerns a method of electromagnetic induction logging, comprising transmitting an electromagnetic field (e.g., a strong electromagnetic field) to the geological formation through a transmitting coil to produce the signal, then conducting the present method of reducing or rejecting common mode interference.

Another aspect of the invention concerns a measuring apparatus or instrument, comprising a receiving coil, a switch (e.g., a switch module), a differential amplifier, a signal acquisition module, and a processor. The receiving coil is configured to receive a formation signal, output the formation signal in real time, and output a common mode interference signal. The switch has an output end configured to output a differential formation signal. The differential amplifier is configured to amplify the differential formation signal and output an amplified differential formation signal. The signal acquisition module is configured to receive the amplified differential formation signal and output data. The processor is connected to the switch and to the signal acquisition module, and is configured to conduct phase-sensitive detection processing on the data, and place the receiving coil and/or the switch separately in each of a forward connection mode and a reverse connection mode. The signal acquisition module receives the formation signal when the receiving coil and/or the switch is in the forward connection mode or the reverse connection mode. The processor obtains a forward measured value and a reverse measured value from the data when the receiving coil and/or the switch is in the forward connection mode and the reverse connection mode, respectively. The processor calculates the formation signal and a common mode signal according to the forward measured value and the reverse measured value. The present measuring apparatus or instrument may be configured to conduct the present methods of reducing or rejecting common mode interference and, in some embodiments, of electromagnetic induction logging.

These and other advantages of the present invention will become readily apparent from the detailed description of various embodiments below.

BRIEF DESCRIPTION OF THE DRAWINGS

FIG. 1 is a flowchart of a measuring method provided by an embodiment of this invention.

FIG. 2 is a block diagram of a common mode interference reduction circuit and/or apparatus useful for downhole electromagnetic measurement in geological formations provided by an embodiment of this invention.

Figure 3:
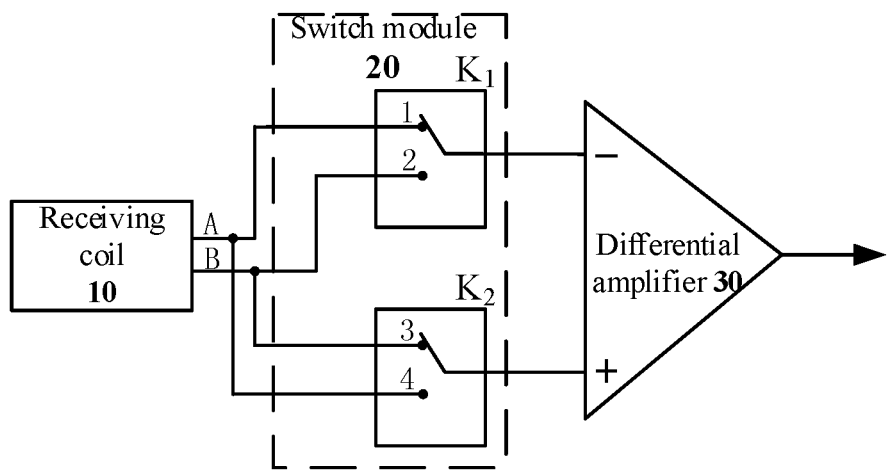
FIG. 3 is a structural diagram illustrating the switch module in the forward connection mode of the receiving coil according to this invention.

The following denotations are included in the drawings: "1" denotes the first stationary contact; "2" denotes the second stationary contact; "3" denotes the third stationary contact; "4" denotes the fourth stationary contact; "A" denotes the first end of a receiving coil; "B" denotes the second end of a receiving coil; "S" denotes a formation signal; "10" denotes a receiving coil; "20" denotes a switch module; "30" denotes a differential amplifier; "40" denotes a signal acquisition module; and "50" denotes a processor.

DETAILED DESCRIPTION

To make the technical solutions to the above-described technical problems and the advantages of the present invention clearer, the following describes the present invention in detail in certain embodiments, with reference to the accompanying drawings. It should be appreciated that the embodiments described herein are used for explanation, but not limitation, of the present invention.

Embodiment 1

FIG. 2 illustrates that in the common mode rejection/reduction method and circuit of the present invention, a measurement is conducted with an instrument or circuit that includes a receiving coil 10, a switch module 20, a differential amplifier 30, a signal acquisition module 40, and a processor 50. The differential amplifier 30 is connected to the output end of the switch module 20, amplifies the differential signal output by the switch module 20, and outputs a data signal to the signal acquisition module 40 for acquisition. The processor 50 is connected to the signal acquisition module 40 and performs phase-sensitive detection processing on the data output by the signal acquisition module 40. The differential amplifier 30 is capable of differential input and common mode rejection.

Figure 4:
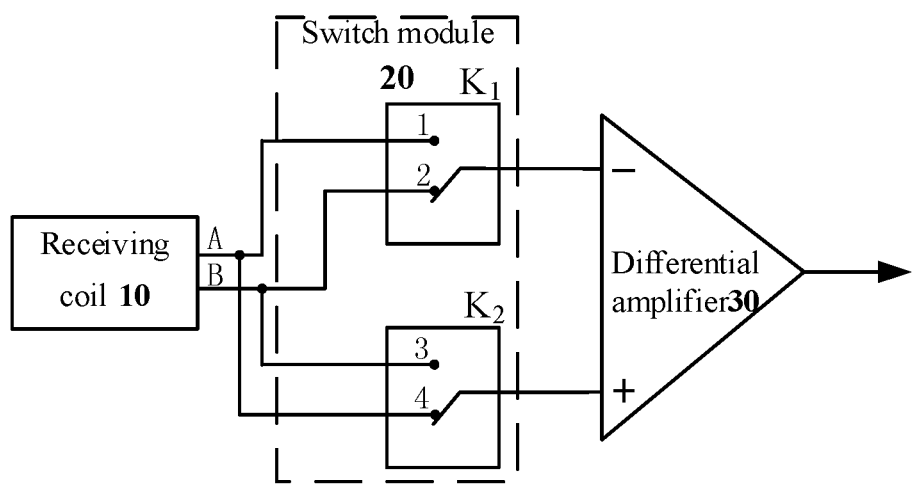
FIG. 4 is a structural diagram illustrating the switch module in the reverse connection mode of the receiving coil according to this invention.

As illustrated by FIGS. 3 and 4, the switch module 20 includes a first switch $K_1$ and a second switch $K_2$. The first stationary contact 1 in the first switch $K_1$ and the fourth stationary contact 4 in the second switch $K_2$ are both connected to the first end A of the receiving coil 10. The second stationary contact 2 in the first switch $K_1$ and the third stationary contact 3 in the second switch $K_2$ are both connected to the second end B of the receiving coil 10. The output of the first switch $K_1$ can be connected to either the first stationary contact 1 or the second stationary contact 2. The output of the second switch $K_2$ can be connected to either the third stationary contact 3 or the fourth stationary contact 4.

When the processor 50 makes the first switch $K_1$ connect the output to the first stationary contact 1 and the second switch $K_2$ connect the output to the third stationary contact 3, the switch module 20 is in the forward connection mode of the receiving coil. When the processor 50 makes the first switch $K_1$ connect the output to the second stationary contact 2 and the second switch $K_2$ connect the output to the third stationary contact 4, the switch module 20 is in the reverse connection mode of the receiving coil.

Embodiments of the switch module 20 include an electromagnetic mechanical switch, or an analog switch based on semiconductor technologies, or a switch component based on microelectromechanical technologies.

Embodiment 2

As illustrated by FIG. 1, the present invention provides a common mode noise rejection method for electromagnetic induction logging instruments/apparatuses. The following steps are included when the foregoing measuring instrument/apparatus (e.g., the circuit in FIG. 2) is used for measurement:

A1. When the switch module 20 is in the forward connection mode of the receiving coil, the receiving coil 10 outputs a formation signal S received in real time together with the common mode interference signal from the coil to the differential amplifier 30, which outputs an amplified formation signal to the signal acquisition module 40. The processor 50 performs phase-sensitive detection processing on the data output by the signal acquisition module 40 and obtains a forward measured value $S_1$, which is denoted by $S_1=(x_1, y_1)$, where $x_1$ represents the real part of the data output by the signal acquisition module 40 and $y_1$ represents the imaginary part.

A2. When the switch module 20 is in the reverse connection mode of the receiving coil, the receiving coil 10 outputs the formation signal S received in real time together with the common mode interference signal from the coil to the differential amplifier 30, which outputs an amplified formation signal to the signal acquisition module 40. The processor 50 performs phase-sensitive detection processing on the data output by the signal acquisition module 40 and obtains the reverse measured value $S_1$, which is denoted by $S_2=(x_2, y_2)$, where $x_2$ represents the real part of the data output by the signal acquisition module 40 and $y_2$ represents the imaginary part.

A3. The processor 50 calculates the formation signal S and the common mode signal $S_c$ from the forward measured value $S_1$ and the reverse measured value $S_2$. The formation signal S may be represented by a differential signal $S_d$. The process for calculating the differential signal $S_d$ is as follows.

When the switch 20 switches the mode of the receiving coil 10 (e.g., from forward connection mode to reverse connection mode), the phase of the differential signal $S_d$ becomes reversed, but its amplitude remains the same, while the phase and amplitude of the common mode signal $S_c$ do not vary according to the mode of the receiving coil 10. According to such a characteristic, the relational expression of the forward measured value $S_1$ and the reverse measured value $S_2$ is as follows:

$$S_1=S_c+S_d$$

$$S_2=S_c-S_d$$

The following can be calculated according to the relational expression above:

Differential signal $S_d=(S_1-S_2)/2$

Common mode signal $S_c=(S_1+S_2)/2$

Thus, the formula for calculating the differential signal $S_d$ is:

$$S_d = (x_1 - x_2, y_1 - y_2)/2$$

Furthermore, the formula for calculating the common mode signal $S_c$ is:

$$S_c = (x_1 + x_2, y_1 + y_2)/2$$

Embodiment 3

There is another process for calculating the formation signal S. After the common mode signal $S_c=(S_1+S_2)/2$ is obtained according to the relational expression of the forward measured value $S_1=(x_1, y_1)$ and the reverse measured value $S_2=(x_2, y_2)$, where $S_c=(x_1+x_2, y_1+y_2)/2$, the formation signal S, which can be considered as a differential signal $S_d$, can be calculated according to the forward measured value $S_1$ and the common mode signal $S_c$. The derivation formula is as follows:

$$S_d = S_1 - S_c$$

Embodiment 4

Yet another calculation process of the formation signal S is as follows. After the common mode signal $S_c=(S_1+S_2)/2$ is obtained according to the relational expression of the forward measured value $S_1=(x_1, y_1)$ and the reverse measured value $S_2=(x_2, y_2)$, where $S_c=(x_1+x_2, y_1+y_2)/2$, the formation signal S, which can be considered as a differential signal $S_d$, can be calculated according to the reverse measured value $S_2$ and the common mode signal $S_c$. The derivation formula is as follows:

$$S_d = S_c - S_2$$

To check the validity of the measuring method of the present invention, the approaches of Embodiments 2 and 3 were used to convert multiple groups of measured data at signal frequencies of 10 KHz and 2 MHz for comparative analysis. The specific results are recorded in Table 1 and Table 2.

TABLE 1

Measured results of the formation signal under different amplitudes of interference using Embodiment 2 (10 KHz)

| Measurement group | | Real part of the forward measured value (mV) | Imaginary part of the forward measured value (mV) | Real part of the formation signal (mV) | Imaginary part of the formation signal (mV) |
|---|---|---|---|---|---|
| 1 | Forward | 38.392 | −14.97 | 73.138 | −33.763 |
|   | Reverse | −34.746 | 18.78 | | |
| 2 | Forward | 37.771 | −14.61 | 73.682 | −33.338 |
|   | Reverse | −35.910 | 18.72 | | |
| 3 | Forward | 37.882 | −13.45 | 73.549 | −33.672 |
|   | Reverse | −35.667 | 20.22 | | |
| 4 | Forward | 38.532 | −10.73 | 73.600 | −33.484 |
|   | Reverse | −35.068 | 22.74 | | |
| 5 | Forward | 38.996 | −9.340 | 73.765 | −33.433 |
|   | Reverse | −34.76 | 24.09 | | |

The measurement data in Table 1 demonstrates that when used in forward and reverse connection modes, respectively, the receiving coil 20 displays large variations in measured results, and the amplitude of the common mode signal $S_c$ is slightly smaller than that of the differential signal $S_d$. When variations occur in the interference signal, i.e., the common mode signal $S_c$, the method of this invention can be used for stable measurement of the differential signal $S_d$, suggesting good rejection of common mode interference signals at the frequency of 10 KHz.

TABLE 2

Measured results of the formation signal under different amplitudes of interference using Embodiment 3 (2 MHz)

| Measurement group | | Real part of the forward measured value (mV) | Imaginary part of the forward measured value (mV) | Real part of the formation signal (mV) | Imaginary part of the formation signal (mV) |
|---|---|---|---|---|---|
| 1 | Forward | 191.472 | −69.804 | −23.581 | 7.154 |
|   | Reverse | 215.054 | −76.958 | | |
| 2 | Forward | 87.374 | −32.720 | −23.468 | 7.163 |
|   | Reverse | 110.842 | −39.88 | | |
| 3 | Forward | 111.500 | −41.289 | −22.909 | 7.23 |
|   | Reverse | 134.409 | −48.523 | | |
| 4 | Forward | 61.681 | −22.914 | −22.957 | 7.09 |
|   | Reverse | 84.638 | −30.005 | | |
| 5 | Forward | 144.70 | −54.708 | −23.182 | 7.095 |
|   | Reverse | 167.88 | −61.803 | | |

The measured data in Table 2 demonstrates that when used in forward and reverse connection modes, respectively, the receiving coil 20 displays small variations in measured results, and the amplitude of the common mode signal $S_c$ is larger than that of the differential signal $S_d$. Despite the existence of large common mode interference signals with the drastically changing amplitude, the method of this invention can be used for stable measurement of the differential signal $S_d$, suggesting good rejection of common mode interference signals for the instrument at the frequency of 2 MHz.

The above description provides embodiments of a downhole electromagnetic induction measurement apparatus with common mode interference reduction and/or rejection, and a corresponding measuring method, but it is not intended to limit the present invention. Any modification, equivalent substitution, improvement, etc. made within the spirit and principles of the present invention shall be included in the scope of protection of the present invention.

What is claimed is:

1. A method of reducing or rejecting common mode interference, comprising:
   using a switch, separately placing a receiving coil in each of a forward connection mode and a reverse connection mode,
   receiving a signal from a geological formation in the receiving coil,
   outputting a formation signal and common mode interference from the receiving coil, wherein the formation signal is a differential signal and is output in real time,
   amplifying the formation signal and the common mode interference using a differential amplifier,
   receiving the amplified formation signal in a signal acquisition module,
   outputting data from the signal acquisition module,
   conducting phase-sensitive detection processing on the data using a processor connected to the signal acquisition module, wherein the processor:
      separately places the receiving coil in each of the forward connection mode and the reverse connection mode,
      obtains a forward measured value when the receiving coil is in the forward connection mode and a reverse measured value when the receiving coil is in the reverse connection mode, and using the processor, calculating the formation signal and the common mode interference according to the forward measured value and the reverse measured value.

2. The method of claim 1, wherein the formation signal and the common mode interference are calculated using the equations:

$$S_1=S_c+S_d$$

$$S_2=S_c-S_d$$

$$S_d=(S_1-S_2)/2$$

$$S_c=(S_1+S_2)/2$$

where $S_d$ represents the differential signal, $S_c$ represents the common mode interference, the forward measured value is $S_1=(x_1, y_1)$, where $x_1$ is a real part of the forward measured value and $y_1$ is an imaginary part of the forward measured value, and the reverse measured value is $S_2=(x_2, y_2)$, where $x_2$ is a real part of the reverse measured value and $y_2$ is the imaginary part of the reverse measured value.

3. The method of claim 2, wherein the formation signal is calculated according to the formula:

$$S_d=S_1-S_c.$$

4. The method of claim 2, wherein the formation signal is calculated according to the formula:

$$S_d=S_c-S_2.$$

5. The method of claim 1, wherein calculating the formation signal and the common mode interference comprises subtracting the common mode interference in one of the forward measured value and the reverse measured value from the common mode interference in the other of the forward measured value and the reverse measured value, thereby reducing or rejecting the common mode interference.

6. A method of electromagnetic induction logging, comprising transmitting a strong electromagnetic field to the geological formation through a transmitting coil to produce the signal, then conducting the method of claim 1.

7. A measuring apparatus, comprising:
a receiving coil configured to receive a formation signal, output the formation signal in real time, and output a common mode interference signal,
a switch having an output end configured to output a differential formation signal,
a differential amplifier configured to amplify the differential formation signal and output an amplified differential formation signal,
a signal acquisition module configured to receive the amplified differential formation signal and to output data, and
a processor connected to the switch and to the signal acquisition module, wherein:

the processor is configured to conduct phase-sensitive detection processing on the data, place the receiving coil and/or the switch separately in each of a forward connection mode and a reverse connection mode, the signal acquisition module receives the formation signal when the receiving coil and/or the switch is in the forward connection mode or the reverse connection mode, the processor obtains a forward measured value from the data when the receiving coil and/or the switch is in the forward connection mode, the processor obtains a reverse measured value when the receiving coil and/or the switch is in the reverse connection mode, and the processor calculates the formation signal and a common mode signal according to the forward measured value and the reverse measured value.

8. The measuring apparatus of claim 7, wherein the processor calculates the formation signal and the common mode interference using the equations:

$$S_1=S_c+S_d$$

$$S_2=S_c-S_d$$

$$S_d=(S_1-S_2)/2$$

$$S_c=(S_1+S_2)/2$$

where $S_d$ represents the differential signal, $S_c$ represents the common mode interference, the forward measured value is $S_1=(x_1, y_1)$, where $x_1$ is a real part of the forward measured value and $y_1$ is an imaginary part of the forward measured value, and the reverse measured value is $S_2=(x_2, y_2)$, where $x_2$ is a real part of the reverse measured value and $y_2$ is the imaginary part of the reverse measured value.

9. The measuring apparatus of claim 8, wherein the processor calculates the formation signal according to the formula:

$$S_d=S_1-S_c.$$

10. The measuring apparatus of claim 8, wherein the processor calculates the formation signal according to the formula:

$$S_d=S_c-S_2.$$

11. The measuring apparatus of claim 7, wherein the processor calculates the formation signal and the common mode interference by subtracting the common mode interference in one of the forward measured value and the reverse measured value from the common mode interference in the other of the forward measured value and the reverse measured value, thereby reducing or rejecting the common mode interference.

12. An electromagnetic induction logging instrument, comprising a transmitting coil configured to transmit a strong electromagnetic field to the geological formation to produce the signal, and the measuring apparatus of claim 7.

* * * * *

UNITED STATES PATENT AND TRADEMARK OFFICE
CERTIFICATE OF CORRECTION

| | | |
|---|---|---|
| PATENT NO. | : 11,988,800 B2 | Page 1 of 1 |
| APPLICATION NO. | : 17/851348 | |
| DATED | : May 21, 2024 | |
| INVENTOR(S) | : Guoyun Guan et al. | |

It is certified that error appears in the above-identified patent and that said Letters Patent is hereby corrected as shown below:

On the Title Page

Item (30), Foreign Application Priority Data, add the following:
"(30) Foreign Application Priority Data
Mar. 22, 2022 (CN) . . . . . . . . . . . . . . . . . . 202210281298"

Signed and Sealed this
Sixth Day of August, 2024

Katherine Kelly Vidal
*Director of the United States Patent and Trademark Office*